US008033904B2

(12) United States Patent
Gatto et al.

(10) Patent No.: US 8,033,904 B2
(45) **Date of Patent: *Oct. 11, 2011**

(54) CHIP-BASED GAMING

(75) Inventors: Jean-Marie Gatto, London (GB); Sylvie Linard, London (GB); Thierry Brunet De Courssou, Henderson, NV (US)

(73) Assignee: IGT, Reno, NV (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/043,141

(22) Filed: Mar. 6, 2008

(65) Prior Publication Data

US 2008/0153578 A1 Jun. 26, 2008

Related U.S. Application Data

(63) Continuation of application No. 11/409,722, filed on Apr. 24, 2006, now Pat. No. 7,371,173.

(60) Provisional application No. 60/758,509, filed on Jan. 11, 2006.

(51) Int. Cl.
*A63F 13/00* (2006.01)

(52) U.S. Cl. ........... 463/16; 273/292; 273/293; 273/274

(58) Field of Classification Search .................... 463/13, 463/16, 20–30; 273/291, 293, 274
See application file for complete search history.

(56) References Cited

U.S. PATENT DOCUMENTS 4,149,728 A * 4/1979 Thompson .................... 273/274
4,593,904 A 6/1986 Graves
4,695,053 A 9/1987 Vazquez, Jr. et al.
5,280,909 A 1/1994 Tracy
5,342,049 A 8/1994 Wichinsky et al.
5,580,053 A 12/1996 Crouch
5,823,873 A 10/1998 Moody
6,012,983 A 1/2000 Walker et al.
6,019,374 A * 2/2000 Breeding ...................... 273/292
6,050,895 A 4/2000 Luciano, Jr. et al.
6,077,163 A 6/2000 Walker et al.

(Continued)

FOREIGN PATENT DOCUMENTS

EP 1 422 672 A2 5/2004

(Continued)

OTHER PUBLICATIONS

International Preliminary Report on Patentability of Jan. 13, 2009 in related PCT application PCT/US06/15446 (14 pages).

(Continued)

*Primary Examiner* — Masud Ahmed
(74) *Attorney, Agent, or Firm* — Young Law Firm, P.C.

(57) ABSTRACT

Chip-Based Gaming includes methods for playing electronic games of chance or skill that provide players with a greater number of options and greater wagering flexibility than previous methods have afforded them. In the present Chip-Based gaming model, players may select virtual betting chips from an onscreen palette and apply those chips to various wagering opportunities throughout a game. Using this model, players are able to make individual bets on each of a slot machine's paylines or wager on making specific hands in Video Poker. Players are also able to buy and/or wager on symbol "nudges" and to buy symbol "re-spins" within a multi-line slot machine, options which provide the player with a much richer, more flexible gaming experience than he or she had heretofore enjoyed.

14 Claims, 10 Drawing Sheets

U.S. PATENT DOCUMENTS

| | | | | |
|---|---|---|---|---|
| 6,120,378 | A | 9/2000 | Moody et al. | |
| 6,146,273 | A | 11/2000 | Olsen | |
| 6,244,957 | B1 | 6/2001 | Walker et al. | |
| 6,264,200 | B1 * | 7/2001 | Smith | 273/274 |
| 6,267,669 | B1 | 7/2001 | Luciano, Jr. et al. | |
| 6,283,474 | B1 | 9/2001 | de Keller | |
| 6,409,597 | B1 | 6/2002 | Mizumoto | |
| 6,500,068 | B2 | 12/2002 | Walker et al. | |
| 6,517,433 | B2 | 2/2003 | Loose et al. | |
| 6,522,312 | B2 | 2/2003 | Ohshima et al. | |
| 6,530,842 | B1 | 3/2003 | Wells et al. | |
| 6,641,477 | B1 | 11/2003 | Dietz, II | |
| 6,761,632 | B2 | 7/2004 | Bansemer et al. | |
| 6,761,633 | B2 | 7/2004 | Riendeau et al. | |
| 6,811,482 | B2 | 11/2004 | Letovsky | |
| 6,893,341 | B2 | 5/2005 | Walker et al. | |
| 7,147,559 | B2 | 12/2006 | Englman | |
| 7,223,171 | B2 | 5/2007 | Colin et al. | |
| 7,478,812 | B2 * | 1/2009 | Sokolov | 273/142 R |
| 7,556,561 | B2 * | 7/2009 | White et al. | 463/13 |
| 7,677,571 | B2 * | 3/2010 | Adams, III | 273/274 |
| 2002/0147040 | A1 | 10/2002 | Walker et al. | |
| 2003/0211881 | A1 | 11/2003 | Walker et al. | |
| 2004/0102238 | A1 | 5/2004 | Taylor | |
| 2004/0217548 | A1 * | 11/2004 | Snow | 273/292 |
| 2004/0242297 | A1 | 12/2004 | Walker | |
| 2004/0259627 | A1 | 12/2004 | Walker et al. | |
| 2005/0040601 | A1 | 2/2005 | Yoseloff et al. | |
| 2005/0049037 | A1 | 3/2005 | Anderson | |
| 2005/0164793 | A1 * | 7/2005 | Merimovich et al. | 463/42 |
| 2005/0192091 | A1 | 9/2005 | Siewert | |
| 2005/0239528 | A1 * | 10/2005 | Moody | 463/13 |
| 2005/0239542 | A1 | 10/2005 | Olsen | |
| 2005/0269782 | A1 * | 12/2005 | Sklansky et al. | 273/292 |
| 2006/0003828 | A1 | 1/2006 | Abecassis | |
| 2006/0003832 | A1 | 1/2006 | Mincey et al. | |
| 2006/0068870 | A1 | 3/2006 | Crawford, III et al. | |
| 2006/0178191 | A1 | 8/2006 | Ellis | |
| 2006/0276243 | A1 * | 12/2006 | Reisdorff et al. | 463/13 |
| 2007/0010312 | A1 | 1/2007 | Ike et al. | |
| 2007/0072682 | A1 | 3/2007 | Crawford, III et al. | |

FOREIGN PATENT DOCUMENTS

| | | | |
|---|---|---|---|
| GB | 2170937 | A | 8/1986 |
| WO | WO0141892 | A2 | 6/2001 |
| WO | 03/089088 | A1 | 10/2003 |

OTHER PUBLICATIONS

Extended European Search Report of Jan. 29, 2010 in related EP Application 06751229.3.

International Search Report mailed Sep. 25, 2007, in related International Application No. PCT/US06/15446, filed Apr. 24, 2006.

Written Opinion mailed Sep. 25, 2007, in related International Application No. PCT/US06/15446, filed Apr. 24, 2006.

EPO Examination Report of Nov. 5, 2010 in related EP patent application 06 751 229.3-1238 (5 pages).

Office Action of Sep. 8, 2010 in related U.S. Appl. No. 12/043,957.

USPTO Office Action of Oct. 12, 2010 in related U.S. Appl. No. 11/562,915.

"Pipe of Fun" documentation accompanying office action of Oct. 12, 2010 in related U.S. Appl. No. 11/562,915, downloaded from http://webarchive.org/web/20030711130600/www.jaibo.net/pipefun/rules.htm.

"Pipe Dream TM" Instruction Manual NES-4P-USA, accompanying office action of Oct. 12, 2010 in related U.S. Appl. No. 11/562,915. http://www.nesfiles.com.

* cited by examiner

CHIP-BASED GAMING

CROSS-REFERENCE TO RELATED APPLICATIONS

This application is a continuation of application Ser. No. 11/409,722, filed Apr. 24, 2006, which application claims the benefit under 35 U.S.C. §119(e) of Provisional Application No. 60/758,509, filed Jan. 11, 2006, which applications are hereby incorporated herein by reference in their entireties.

BACKGROUND OF THE INVENTION

1. Field of the Invention

The present inventions relate generally to the field of regulated pay computer-controlled games, either games of skills or games of chance.

2. Description of the Prior Art and Related Information

Existing models for betting within electronic games of chance such as video poker or multi-line slot machines are limited, as players are conventionally only offered high-level bets that apply across a number of potential onscreen events in each game. This betting model applies to multi-line slot machines, in that players are conventionally able to manipulate their bet sizes globally, across a number of pay lines, but are unable to assign specific bet sizes to each payline or to selected individual pay lines. This conventional betting model also applies to most video poker machines, in that players are able to manipulate their bet sizes across a number of potential reward-generating hands, but are not able to assign specific bets to specific hands.

SUMMARY OF THE INVENTION

Embodiments of the present invention that incorporate the present Chip-Based Gaming model give players a greater number of choices and a greater degree of flexibility than do conventional betting models. According to embodiments of the present invention, games, gaming methods and gaming machines that incorporate the present Chip-Based Gaming Model may advantageously include a "Chip Palette," which may be displayed as an onscreen menu that allows players to select betting chips of varying denomination and then apply those bets to a variety of selected onscreen features.

Using the present Chip Palette, a slot machine player may assign separate bets to each individual payline or to more than one individual payline on a multi-line slot machine, an innovation that allows players to pick which pay lines they play and to weigh their payline bets differently. Since some multi-line slot machines have over one hundred pay lines, this feature empowers players to radically tailor their gaming experience. Moreover, using the present Chip Palette, a multi-line slot machine player may not only decide when he or she wants to "re-spin" a symbol, he or she may also decide how much to bet that the re-spin will result in a winning payline. Players of games of chance incorporating embodiments of the present invention may also purchase a Hold-Down chip or a Nudge chip to further affect game play. The player may also use the "Buy Symbols to Replace Those You Don't Like" feature. This feature allows the player to further wager on nearly-winning pay lines by buying an opportunity to replace an unwanted symbol with a new symbol that may make the previously nearly winning payline into a winning one.

Using the present Chip Palette, a video poker player may place an extra wager on various reward generating hands, such as a full house or three of a kind, thereby increasing his award if he is dealt the hand on which he wagered. The present Chip Palette may also be advantageously used in other games of chance, as will be evident from the description below.

According to an embodiment thereof, the present invention is a method of enabling a player to play a regulated gaming machine configured as a regulated video poker game, the regulated gaming machine including a player activated pointing device, the method comprising the steps of displaying a video poker pay table that includes a plurality of poker hands on which the player may place a bet; displaying a plurality of betting chips; selecting, using the player activated pointing device, a first betting chip of the displayed plurality of betting chips; placing the selected first betting chip, using the player activated pointing device, on a first selected poker hand of the displayed video poker pay table; selecting, using the player activated pointing device, a second betting chip of the displayed plurality of betting chips; placing the selected second betting chip, using the player activated pointing device, on a second selected poker hand of the displayed video poker pay table, the second selected poker hand being different from the first selected poker hand; randomly dealing a plurality of cards; displaying at least one of the dealt plurality of cards face up, and rewarding the player according to the selected first betting chip if the displayed cards collectively form the first selected poker hand and rewarding the player according to the selected second betting chip if the displayed cards collectively form the second selected poker hand.

The second displaying step may be carried out with the betting chips being of different denominations, the first selecting step may be carried out with the first betting chip being of a first denomination and the second selecting step may be carried out with the second betting chip being of a second denomination that is different from the first denomination. The second displaying step may be carried out with the betting chips including at least one of a hold-down chip configured to enable the player to hold down a card on which the hold-down chip is placed such that the held-down card may be unaffected by a re-deal of one or more of the plurality of face up cards; a re-deal chip configured to enable the player to randomly re-deal a card on which the re-deal chip is placed, and the method may further include steps of placing, using the player activated pointing device, one of the hold-down chip and the re-deal chip on a selected one of the displayed faced up cards and carrying out a re-dealing step to one of re-deal all but the card on which the hold-down chip has been placed, and re-deal only the card on which the re-deal chip has been placed. The method may also include a step of grouping the displayed plurality of betting chips together by denomination to form a chip palette. The method may also include a step of dynamically configuring the palette of betting chips according to a state of game play.

According to another embodiment thereof, the present invention is a method of enabling a player to play a regulated gaming machine configured as a regulated video poker game, the regulated gaming machine including a player activated pointing device, the method comprising the steps of displaying a video poker pay table that includes a plurality of poker hands on which the player may place a bet; displaying a plurality of betting chips; selecting, using the player activated pointing device, a betting chip of the displayed plurality of betting chips; placing the selected betting chip, using the player activated pointing device, on a player-selected poker hand of the displayed video poker pay table before any cards are dealt; randomly dealing a plurality of cards; displaying at least one of the dealt plurality of cards face up; enabling the player to at least one of place additional bets and request a re-deal of at least one of the displayed face up cards according to a version of poker with which the regulated gaming machine may be configured, and rewarding the player according to the selected betting chip if the displayed cards collectively form the player-selected poker hand.

The second displaying step may be carried out with the betting chips including at least one of a hold-down chip configured to enable the player to hold down a card on which the hold-down chip is placed such that the held-down card is unaffected by a re-deal of one or more of the plurality of face up cards; a re-deal chip that is configured to enable the player to randomly re-deal a card on which the re-deal chip may be placed, and the method may further include steps of placing, using the player activated pointing device, one of the hold-down chip and the re-deal chip on a selected one of the displayed faced up cards and carrying out a re-dealing step to one of re-deal all but the card on which the hold-down chip has been placed, and re-deal only the card on which the re-deal chip has been placed.

The method may also include a step of grouping the displayed plurality of betting chips together by denomination to form a chip palette. The method may also include a step of dynamically configuring the palette of betting chips according to a state of game play.

BRIEF DESCRIPTION OF THE DRAWINGS

FIG. 1 also depicts some illustrative and exemplary games in which the present Chip Palette may be applied to great advantage.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
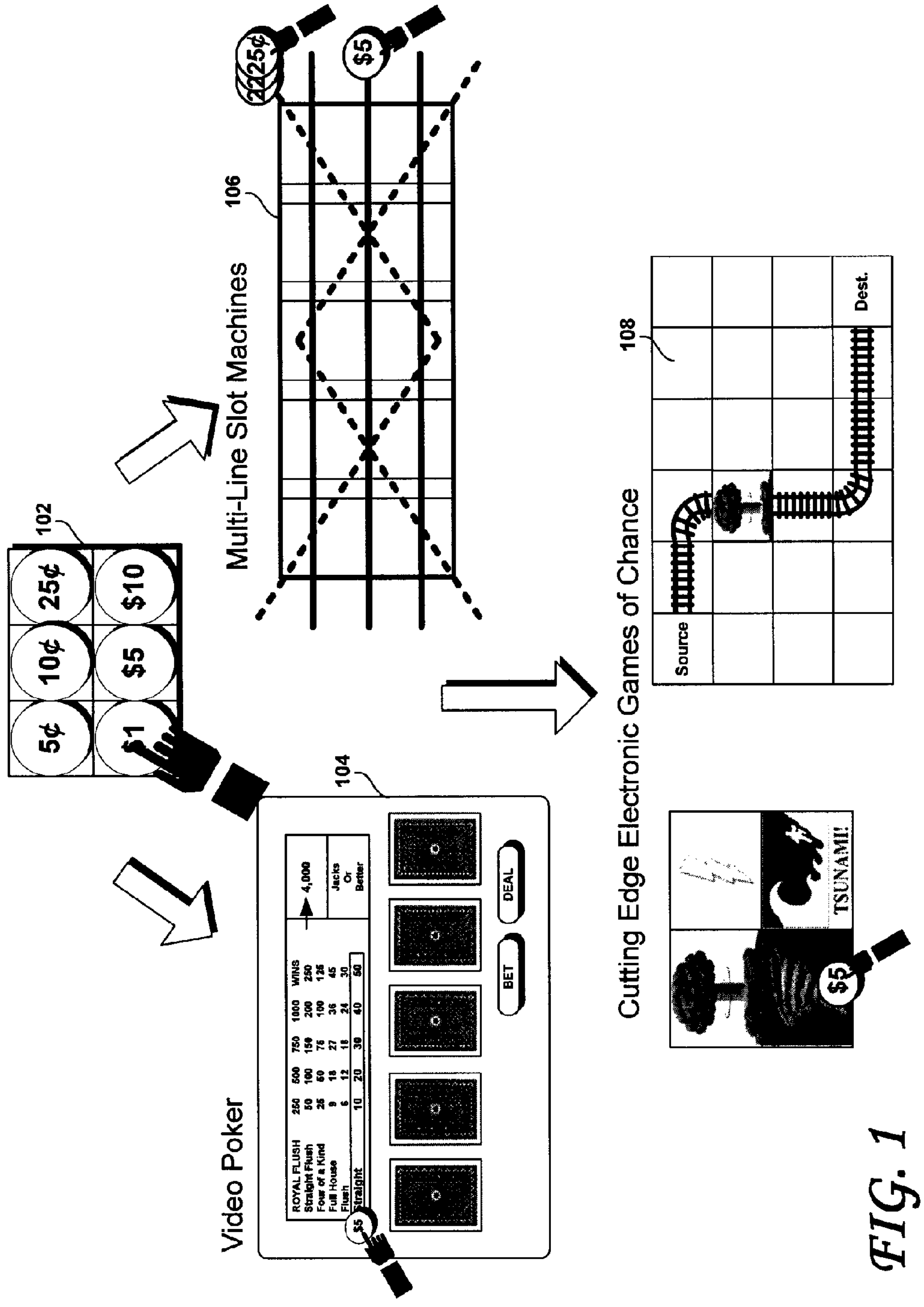
FIG. 1 introduces Chip-Based Gaming and the "Chip Palette," according to embodiments of the present invention.

FIG. 1 introduces the concepts of Chip-Based Gaming and the "Chip Palette." 102. FIG. 1 also illustrates some exemplary games in which the Chip-Based Gaming Model may be applied. These examples include (but are not limited to) video poker 104, multi-line slot machines 106, and newer, cutting edge electronic games of chance such as shown at reference numeral 108 and disclosed in co-pending and commonly assigned US provisional application entitled "Multi-Act Style Electronic Game" Ser. No. 60/738,812 filed on Nov. 22, 2005, the disclosure of which is hereby incorporated by reference in its entirety.

Figure 2:
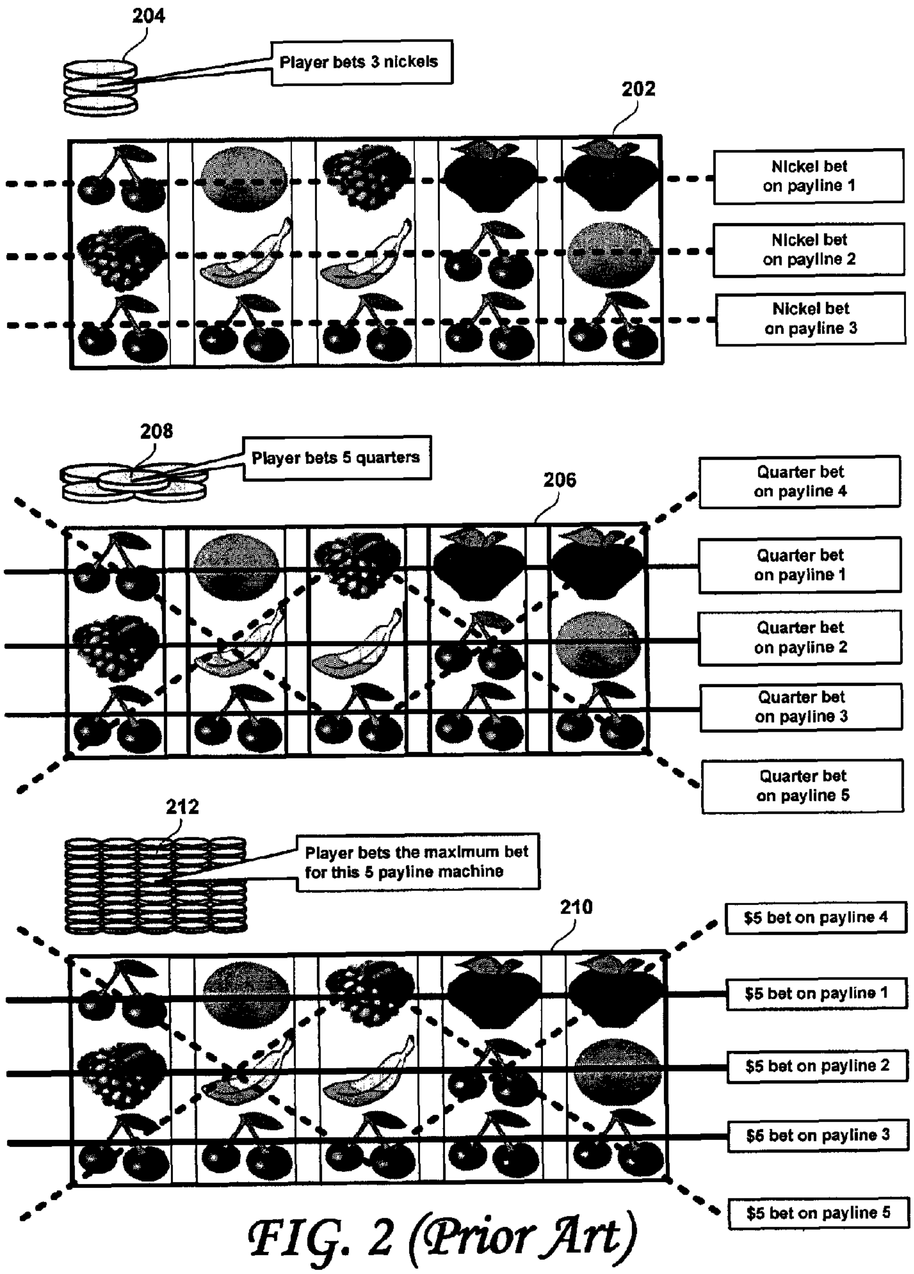
FIG. 2 (Prior Art)
FIG. 2 illustrates the manner in which conventional multi-line slot machines weigh each payline evenly.

Prior art FIG. 2 depicts three sample slot machine displays that collectively illustrate how player bets are spread evenly across pay lines in conventional multi-line electronic slot machines. The top-most drawing in FIG. 2 shows a player betting three nickels 204 on a machine with a maximum of three pay lines, as shown at 202. To do so, the player applies one nickel to each of three separate pay lines, thereby evenly spreading his or her bets across available pay lines. The middle drawing in FIG. 2 illustrates the situation in which a player bets five quarters 208 on a gaming machine with five pay lines, as shown at 206. To do this, the player applies one quarter to each of the five pay lines. The bottom drawing in FIG. 2 shows a player betting one hundred quarters 212 on a gaming machine with five separate pay lines, as shown at 210. To do so, the player may place ten quarters on each of the five pay lines, which is equivalent to five separate bets of five dollars each, or $25 spread evenly across all available pay lines. Collectively, the drawings of FIG. 2 demonstrate that, in the conventional multi-line slot model, players may activate more pay lines or increase the size of their bet globally, but may not apply different-sized bets to different pay lines within a same gaming machine.

Figure 3:
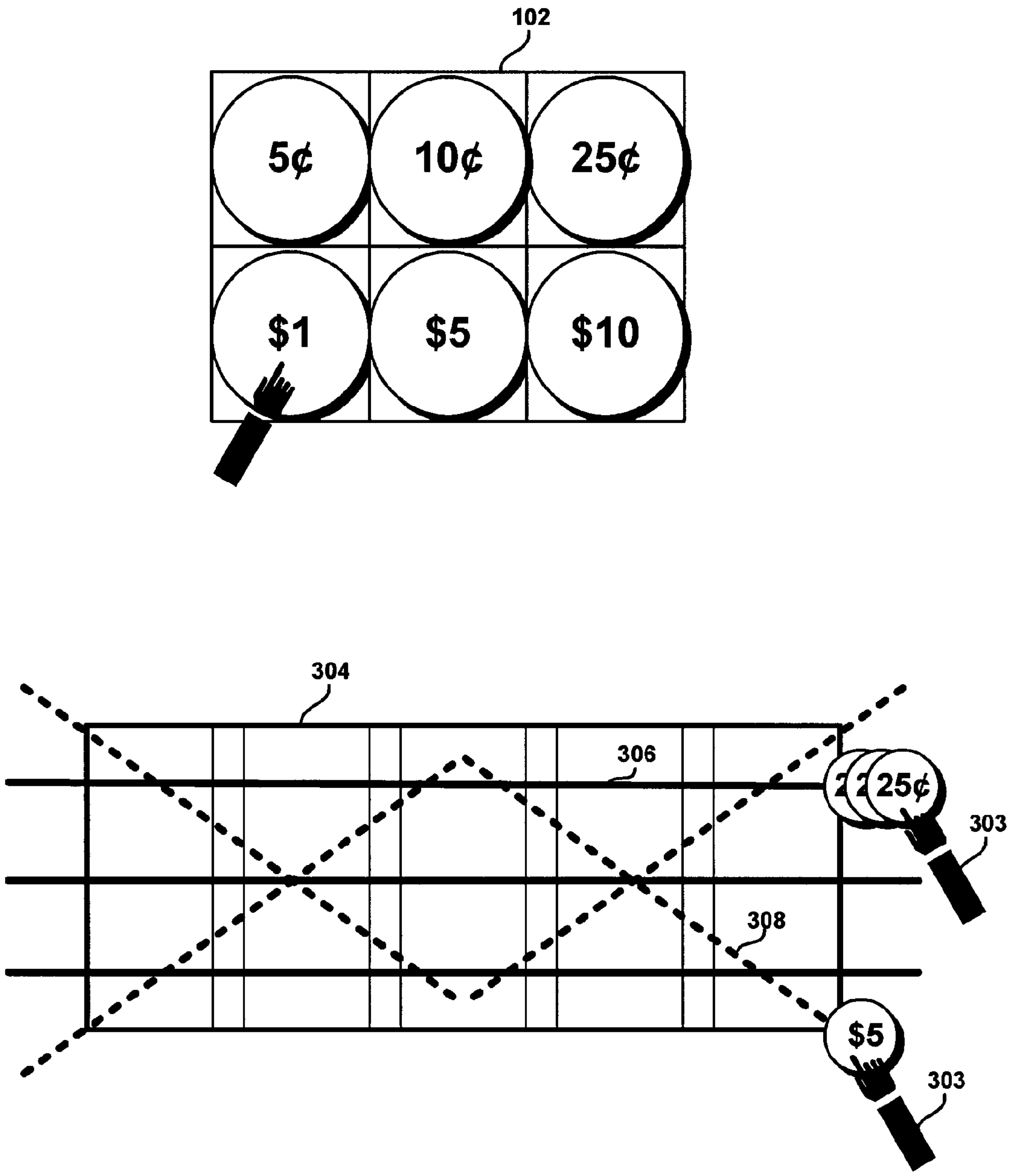
FIG. 3 shows the manner in which the present Chip Palette may be used to bet on individual pay lines of a multi-line slot machine, according to an embodiment of the present invention.

FIG. 3 depicts both an exemplary "Chip Palette" 102 and a sample display screen 304 from a Chip-Based Slot Machine. Note that the slot machine symbols (oranges, cherries, etc.) have been omitted from the display screen 304 for clarity of illustration. The Chip Palette 102, according to an embodiment thereof, may include an onscreen menu that may contain a series of betting chips of different denominations. In the exemplary embodiment shown in FIG. 3, the Chip Palette 102 includes betting chips having denominations of 5¢, 10¢, 25¢, $1, $5 and $10, although other combinations are possible. Players may utilize the Chip Palette 102 to select a bet size and then apply (e.g., drag and drop) that bet to a variety of onscreen features including but not limited to pay lines, re-spins, and nudges, as detailed herein below. As shown in the bottom drawing of FIG. 3, players may take betting chips of different denominations from the Chip Palette 102 (using a pointing device 303, for example) and apply selected betting chips from the Chip Palette 102 to separate and player selected pay lines on a Chip-Based Slot Machine. For example and as shown in the bottom drawing of FIG. 3, the player may take three quarters from the Chip Palette 102 and place them on the payline 306 and may take one five dollar chip from the Chip Palette 102 and place that chip on payline 308. This innovation gives players the ability to 1) bet on only those pay lines on which they want to play and 2) weigh their individual pay lines bets differently than others, if they wish to do so. According to one embodiment of the present invention, players may be allowed to select chips from their Chip Palette and place bets therewith up to their available balance or credit limit.

Figure 4A:
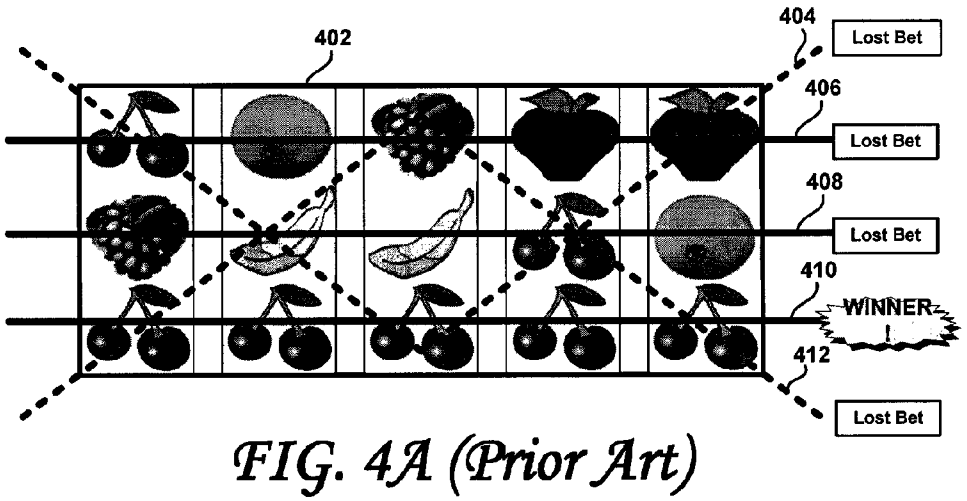
FIG. 4A (Prior Art)
FIG. 4A illustrates aspects of a conventional multi-line slot machine.
Figure 4B:
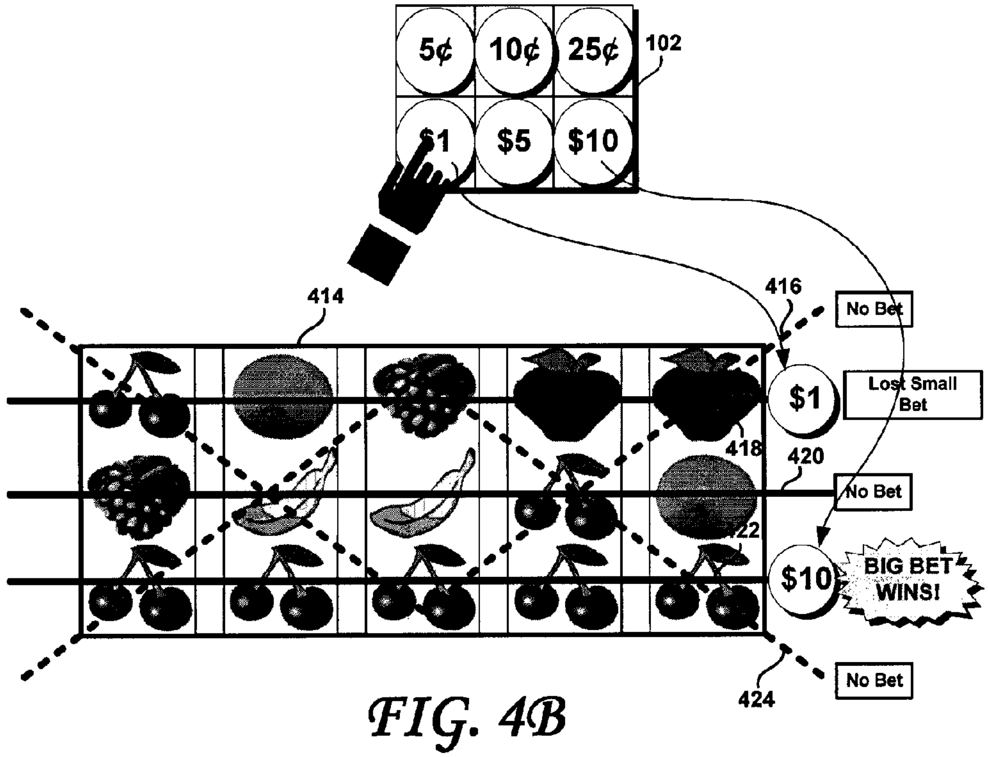
FIG. 4B illustrates further aspects of the present Chip-Based Model, according to embodiments of the present invention.

FIG. 4A shows a display 402 of a conventional multi-line slot machine and shows that betting opportunities are conventionally limited to spreading all of one's bets evenly across pay lines. As shown, pay lines 404, 406, 408 and 412 are losing bets, whereas payline 410 is a winning payline. FIG. 4B shows a display 414 of a Chip-Based slot machine according to an embodiment of the present invention. As shown, Chip-Based slot machines according to embodiments of the present invention enable the player to skip betting on some pay lines and/or to weigh (e.g., bet different amounts) one or more pay lines differently than one or more other pay lines. That is, the player may bet different amounts on one or more selected pay lines than on other or remaining pay lines. In the embodiment shown in FIG. 4B, the player has not placed bets on pay lines 416, 420 or 424. Moreover, the player has used the Chip Palette to place a $1 bet on payline 418 and a $10 bet on payline 422. Collectively, FIGS. 4A and 4B illustrate that while conventional slot machines only allow bets to be spread evenly across all pay lines, embodiments of the present invention enable players the flexibility to refrain from betting on some pay lines and to freely select the size of their bets on other pay lines.

Figure 5:
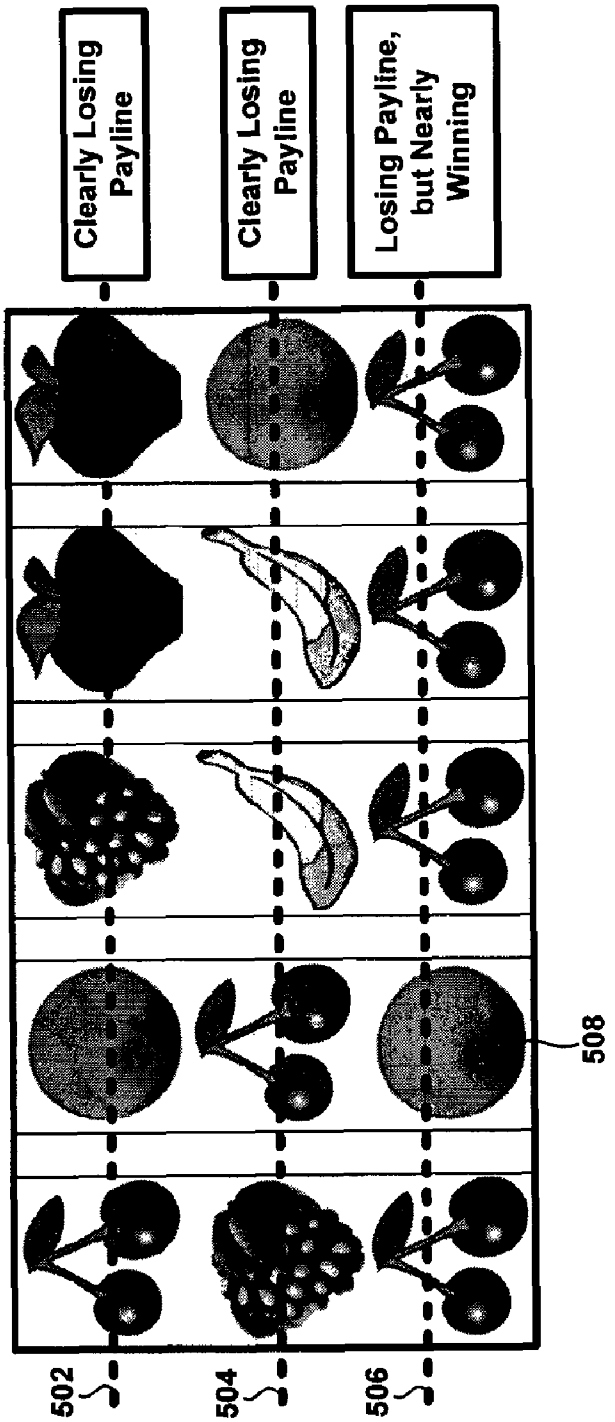
FIG. 5 (Prior Art)
FIG. 5 illustrates how, in conventional slot machines, near-winning pay lines generate no greater excitement, reward, or betting opportunities than do clearly losing pay lines.

FIG. 5 shows a conventional multi-line slot machine display and illustrates the concept that, on such machines, near-winning pay lines (such as shown at 506, which would be a winning payline but for the presence of the orange symbol at 508) generate no greater reward, excitement, or betting opportunities than do clearly-losing pay lines (such as shown at 502 and 504). In such gaming machines, a losing payline is just that, a losing payline, and can never become otherwise.

Figure 6:
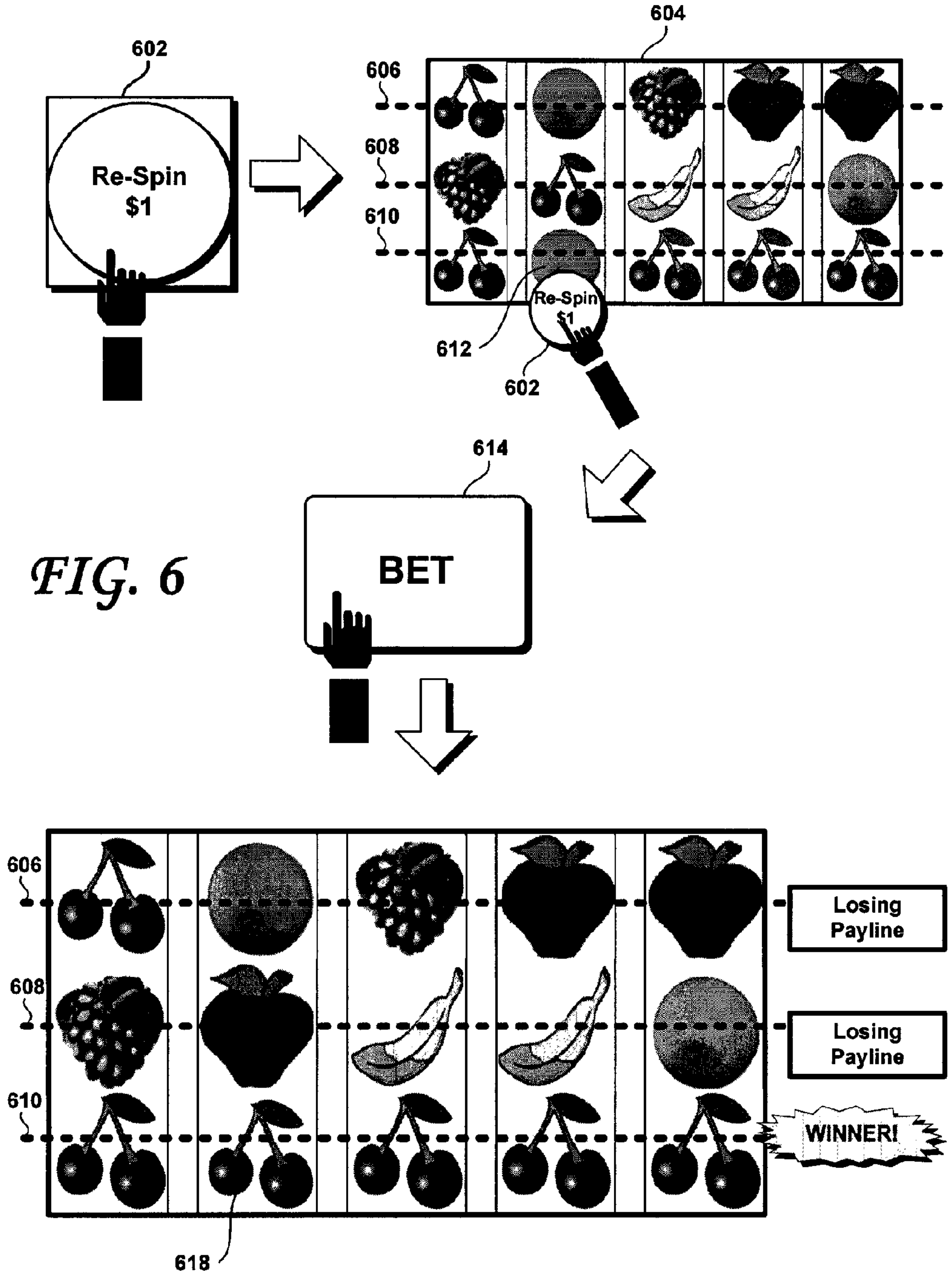
FIG. 6 illustrates how the present Chip Palette may be used in the "Buy a Symbol to Replace Those You Don't Like" feature, according to another embodiment of the present invention.

In contrast, embodiments of the present invention heighten the player's rewards and excitement by enabling the player to buy another spin on one or more reels that display symbols that the player does not like. In practice, the player may use this feature, for example, to "buy" another shot at a near winning (but currently losing) payline. As shown, FIG. 6 shows a display 604 showing three losing pay lines, as shown at reference numerals 606, 608 and 610. Of these pay lines 606 and 608 are clearly losing pay lines, in that no more than two symbols match (although that need not be the criterion for a clearly losing payline). Payline 610, on the other hand, although still a losing payline, may also be characterized as "nearly winning," as it would be a winning payline if the orange symbol 612 were to be replaced with the cherries symbol. Embodiments of the present invention afford the player the opportunity to bet that a re-spin of a reel that currently displays an unwanted symbol will result in a winning payline. That is, the player may bet (in the example of FIG. 6, $1) that a re-spin of the reel 612 currently displaying the orange symbol will result in that reel displaying the cherries symbol, thereby transforming a previously losing payline into a winning one. To do so, the player may select a Re-Spin Chip 602 (which may be incorporated in a Chip Palette according to embodiments of the present invention) and place that Re-Spin Chip onto the reel 612 within the payline 610. In effect, after a nearly successful spin, the player may elect to buy new symbols by placing a Re-Spin Chip on a reel or reels that he or she wishes to re-spin. Alternatively or in addition to the above, the player may purchase a "Hold-Down Chip" and place such a Hold-Down Chip on a reel that he or she wishes to hold-down (while the other reels spin or re-spin). The Chip Palette may dynamically change during game play to offer the player the appropriate or available chips based on contextual information relative to the state of the game. That is, the Chip Palette may offer one or more Re-Spin and/or Hold-Down Chips of selected denominations only after the player has spun the reels and the winning or losing state of the pay lines has been determined.

As shown in FIG. 6, after a Re-Spin Chip 602 is selected from the Chip Palette and placed on reel 612, the player may hit a Bet button 614 or perform some equivalent action, to cause the re-spin of reel 612 (all other reels remaining static). As shown at 618, in this example, the player's bet and re-spin of reel 612 has paid off, as the re-spin caused the hoped-for symbol (the orange symbol, in this case) to appear, and the previously losing payline 610 is now a winning payline. FIG. 6 shows the manner in which a player, playing on a Chip-Based Machine according to an embodiment of the present invention, may buy an opportunity to redraw certain symbols in an attempt to form winning pay lines. In contrast with the conventional approach shown in FIG. 6, embodiments of the present invention heighten the player's anticipation and potential rewards by affording them the ability to take another shot at a payline that is nearly winning. It is understood that the paytables and/or odds may be changed for the case wherein a re-spin and/or a hold-down of a selected payline or pay lines has occurred, subject to applicable gaming regulations. For example, the odds of a single selected symbol appearing after a re-spin may be preset to equal the odds of achieving a winning payline (e.g., five cherries, in this case) had all of the reels been re-spun. However, other implementations are possible, subject to applicable laws and gaming regulations.

Figure 7:
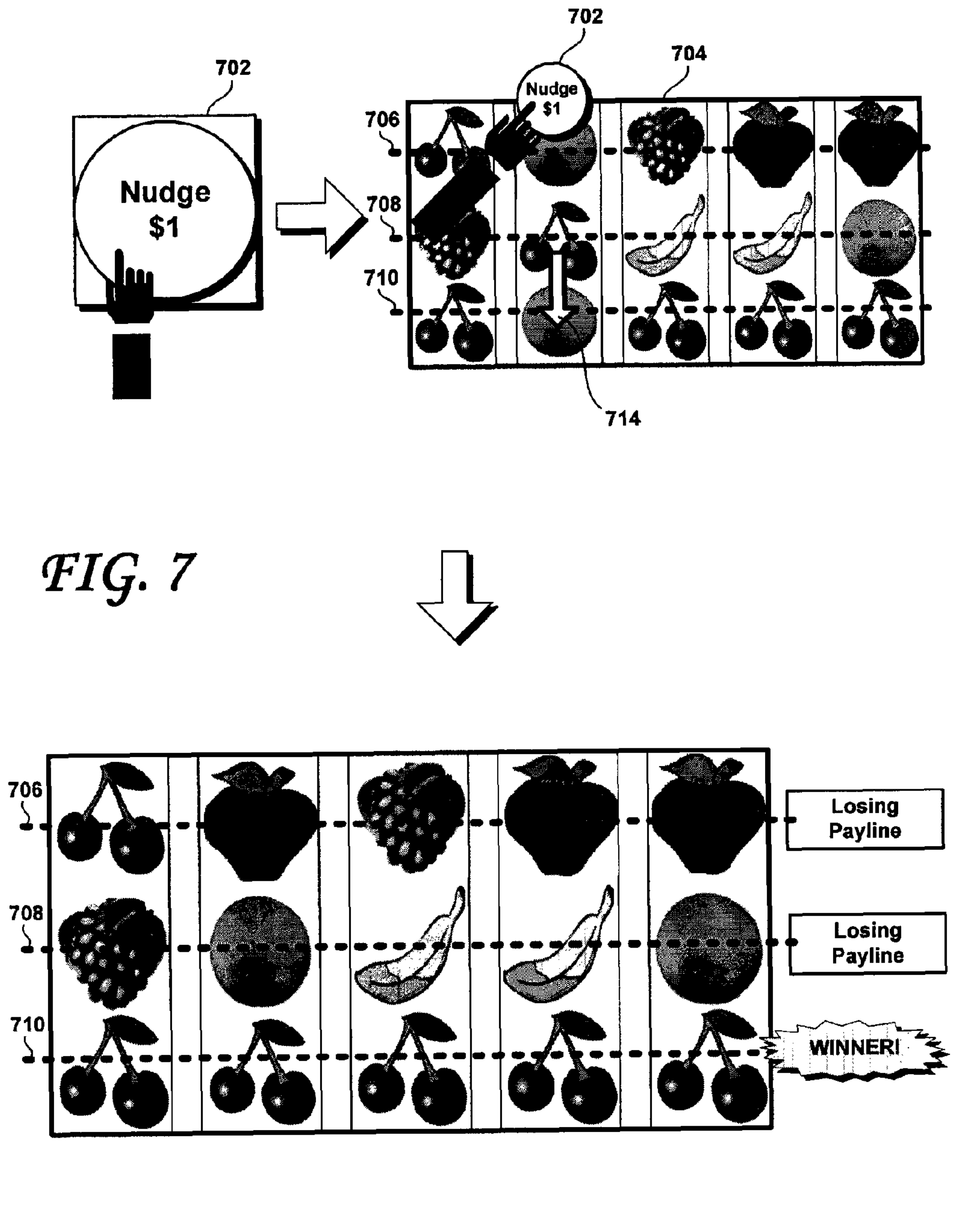
FIG. 7 illustrates how the "Chip-Based Nudge" grants players the opportunity to replace losing symbols with adjacent symbols to create winning pay lines, according to a further embodiment of the present invention.

FIG. 7 shows another embodiment of the present invention. As shown, the Chip Palette may include a "Nudge" Chip, as shown at 702. As shown, the display 704 of the present Chip-Based gaming machine reveals that the just concluded game play resulted in three losing pay lines 706, 708 and 710, of which payline 710 may be considered to be nearly winning. According to an embodiment of the present invention, the player may place one or more bets using one or more Nudge Chips 702, which grants the player the opportunity to (nudge the reels to) move symbols up and down or between reels. For example, the player may place a Nudge Chip 702 on a selected column of reels, in the hopes that the effect of the nudge cause the cherries symbol to drop into the third payline 710, as suggested by the arrow 714, to thereby transform an initially loosing payline into a winning one. FIG. 7 illustrates how a player playing on a Chip-Based gaming machine may buy the opportunity to move an adjacent symbol or symbols into a payline or pay lines to form a winning payline or pay lines. According to an embodiment of the present invention, placing and releasing a Nudge Chip on a payline or column of pay lines may have the immediate effect of nudging the affected reels, without requiring the player to push a "bet" button. Of course, other implementation details are possible.

Figure 8:
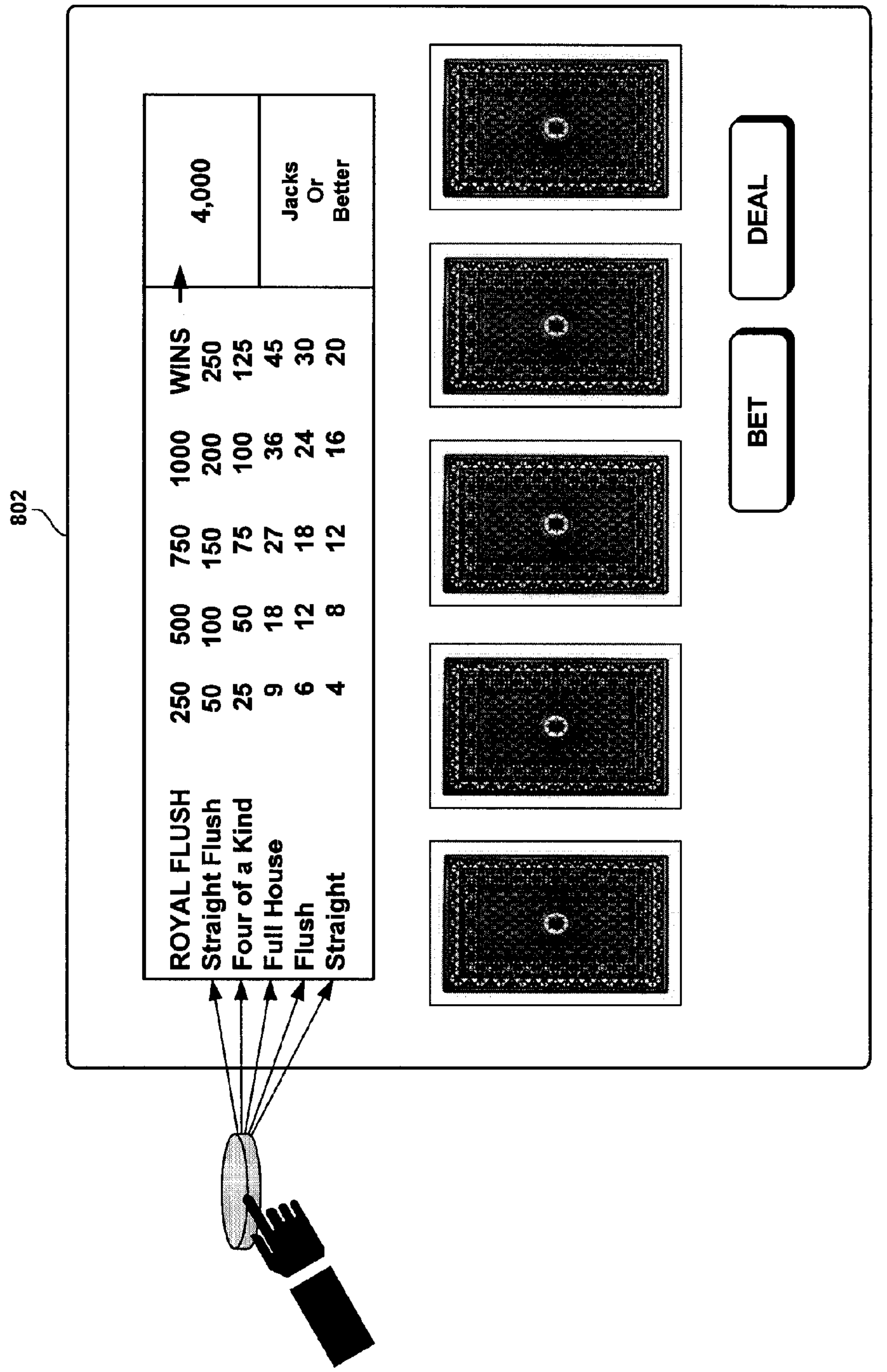
FIG. 8 (Prior Art)
FIG. 8 illustrates how betting is typically handled in conventional video poker games.

FIG. 8 illustrates how betting is typically handled in conventional video poker games, such as shown at 802. In such games, every wager a player makes is divided across all reward-generating hands such that players are not able to increase their wager on making a particular hand without increasing their wagers evenly across all reward-generating hands. Indeed, conventional betting methods for Video Poker spread bets evenly across a standard pay table such that a small percentage of each player's wager is applied to every possible reward generating hand.

Figure 9:
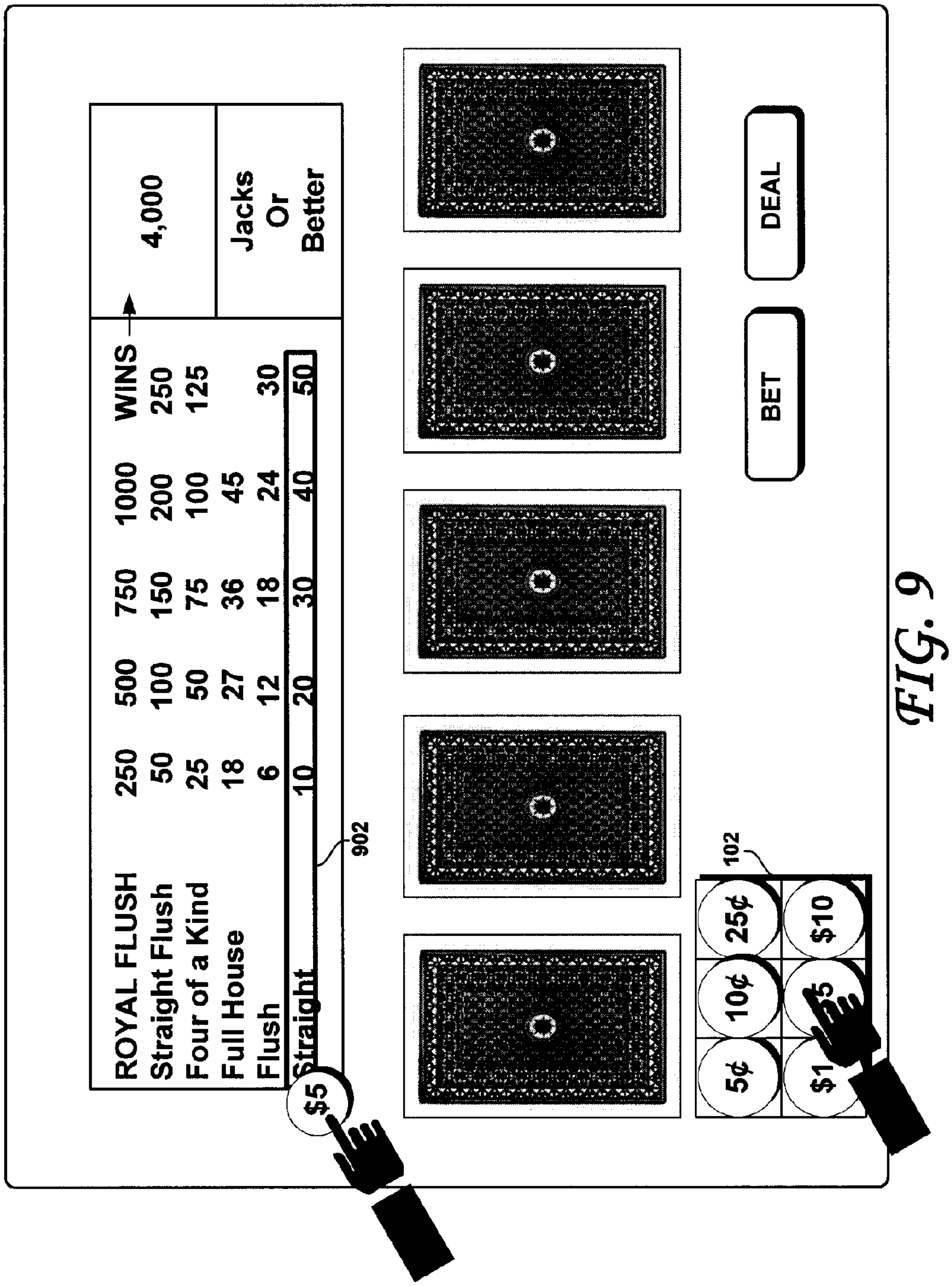
FIG. 9 demonstrates how betting may be handled in a Chip-Based video poker game, according to still further embodiments of the present invention.

FIG. 9 illustrates how betting may be enhanced in a Chip-Based video poker game according to an embodiment of the present invention. In Chip-Based gaming machines (such as Video Poker gaming machines, for example), players may place a betting chip (selected from a Chip Palette 102, for example) on a particular hand prior to the deal, thereby increasing the reward structure for achieving that hand. Therefore, the Chip Based gaming machines grant players the flexibility to alter their wager on making specific hands and thus affect the game's pay table. As shown in FIG. 9, a Chip Palette 102 may be provided that enables the player to place a betting chip (in this case, a $5 bet) on a specific, player-selected hand (in this case, the Straight 902), thereby affecting the payout to the player should the player be dealt that hand. Note that the player may bet different amounts on some hands and/or place no bets on other hands. Note also that the Chip Palette 102 need not be represented at all, or may be differently represented than shown in FIG. 9. Alternatively still, its functionality may be incorporated within the game, without explicitly manifesting its presence on the game display. Moreover, versions Re-Spin and Hold-Down Chips (or variations thereof) may also be used in Video Poker and similar games, to enable the player the ability to buy a re-deal of a specific card or cards, in a manner similar to that described and shown relative to FIG. 6.

Figure 10:
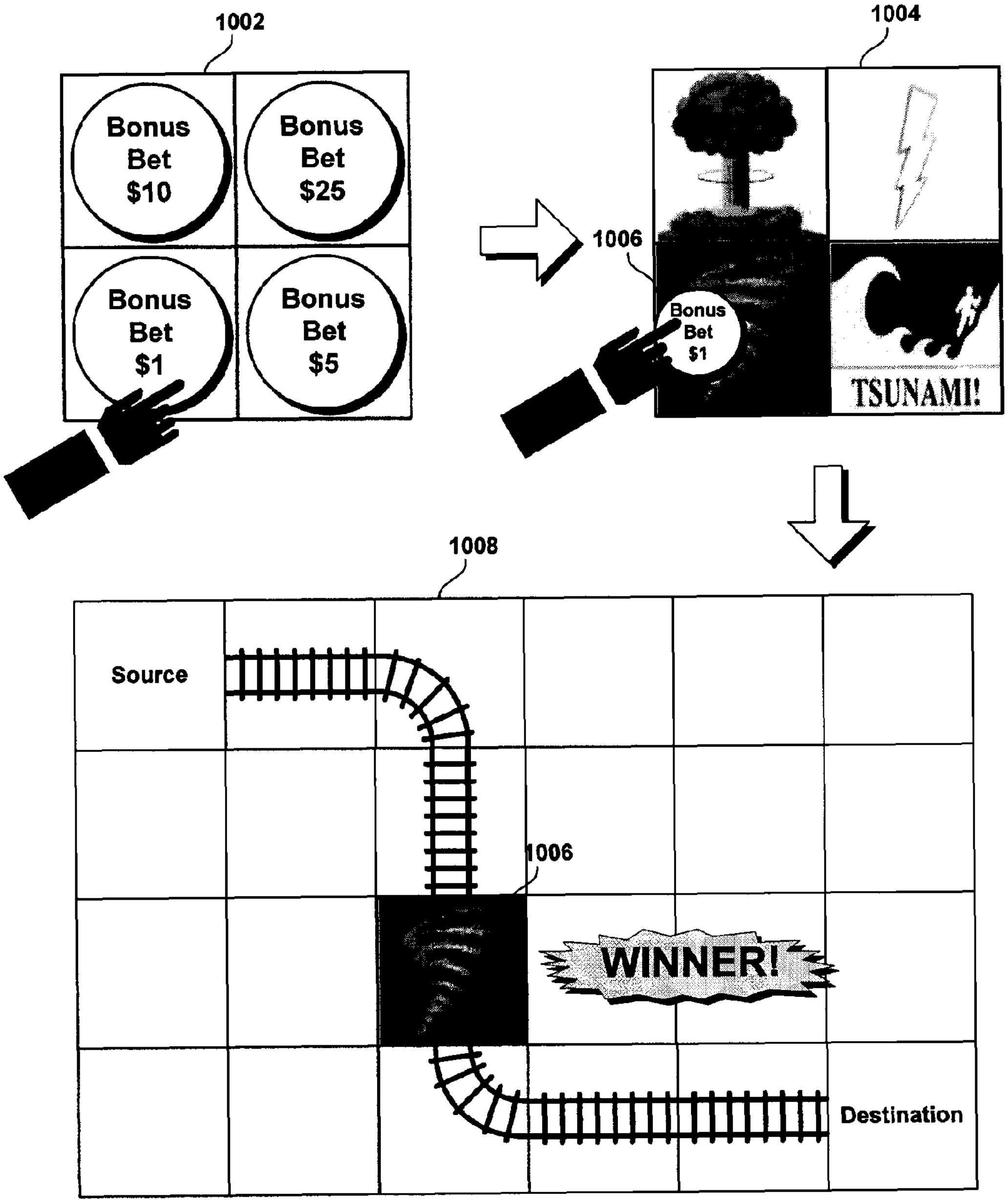
FIG. 10 illustrates how Chip-Based Gaming may be used in cutting edge electronic games of chance, according to further embodiments of the present invention.

FIG. 10 depicts a cutting edge game of chance that makes use of Chip-Based Gaming according to yet another embodiment of the present invention. As show, a Chip Palette 1002 may display at an opportune time during game play to allow players to bet on onscreen features and events. Such features and events may appear and occur during game play of most any game of chance or during game play in a multi-act style electronic game, as disclosed in previously incorporated provisional patent application Ser. No. 60/738,812. As shown, the user may decide to wager on the occurrence of a specific event of a plurality of events 1004 that may or may not randomly occur during later game play. In the illustrative example shown in FIG. 10, the player wagers that a tornado 1006 will occur and disrupt the railroad 1008. If such a tornado actually occurs during later game play, as shown in FIG. 10, the player will be rewarded according to his or her wager (in this case, a $1 bet) and the appropriate pay table. As electronic games of chance continue to evolve, the Chip-Based Gaming model disclosed herein will continue to grant the player maximum wagering flexibility. As the narrative of games of chances evolves from a single occurrence or premise to a player-directed script-based or interactive gaming experience, the opportunities to bet on selected events, features, characters and the like will increase.

While the foregoing detailed description has described several embodiments of this invention, it is to be understood that the above description is illustrative only and not limiting of the disclosed invention. For example, the Chip Palette according to embodiments of the present invention may be configured such as to appear and disappear during game play according to, for example, the availability within the game, of events or occurrences on which the player is authorized to place bets, the sophistication of the player or the desired complexity of game play. Occasionally, the Chip Palette may include a "Comp Chip." That is, to reward persistent players, a free chip of a selected denomination may be provided within the Chip Palette to enable the player to place a bet at no expense. Indeed, a number of modifications will no doubt occur to persons of skill in this art. All such modifications, however, should be deemed to fall within the scope of the present invention.

What is claimed is:

1. A method of enabling a player to play a regulated gaming machine configured as a regulated video poker game, the regulated gaming machine including a processor and a player activated pointing device, the method comprising the steps of:

displaying a video poker pay table that includes a plurality of payouts for a corresponding plurality of poker hands on which the player may place a bet;

displaying a plurality of betting chips;

selecting, using the player activated pointing device, a first betting chip of the displayed plurality of betting chips;

placing the selected first betting chip, using the player activated pointing device, on a first selected poker hand of the displayed video poker pay table;

selecting, using the player activated pointing device, a second betting chip of the displayed plurality of betting chips;

placing the selected second betting chip, using the player activated pointing device, on a second selected poker hand of the displayed video poker pay table, the second selected poker hand being different from the first selected poker hand;

randomly dealing a plurality of cards using the processor;

displaying at least one of the dealt plurality of cards face up;

rewarding the player according to the selected first betting chip if the displayed cards collectively form the first selected poker hand and rewarding the player according to the selected second betting chip if the displayed cards collectively form the second selected poker hand.

2. The method of claim 1, wherein the second displaying step is carried out with the betting chips being of different denominations, wherein the first selecting step is carried out with the first betting chip being of a first denomination and wherein the second selecting step is carried out with the second betting chip being of a second denomination that is different from the first denomination.

3. The method of claim 1, further comprising a step of grouping the displayed plurality of betting chips together by denomination to form a chip palette.

4. The method of claim 3, further comprising the step of dynamically configuring the palette of betting chips according to a state of game play.

5. A method of enabling a player to play a regulated gaming machine configured as a regulated video poker game, the regulated gaming machine including a player activated pointing device and a processor, the method comprising the steps of:

displaying a video poker pay table that includes a plurality of payouts for a corresponding plurality of poker hands on which the player may place a bet;

displaying a plurality of betting chips;

selecting, using the player activated pointing device, a betting chip of the displayed plurality of betting chips;

placing the selected betting chip, using the player activated pointing device, on a player-selected poker hand of the displayed video poker pay table before any cards are dealt;

randomly dealing a plurality of cards using the processor;

displaying at least one of the dealt plurality of cards face up;

enabling the player to at least one of:

place an additional bet and request a re-deal of at least one of the displayed face up cards according to a version of poker with which the regulated gaming machine is configured and to cause the displayed pay table to change according to at least one of the additional bet and the re-deal, and rewarding the player according to the selected betting chip if the displayed cards collectively form the player-selected poker hand.

6. The method of claim 5, further comprising a step of grouping the displayed plurality of betting chips together by denomination to form a chip palette.

7. The method of claim 6, further comprising the step of dynamically configuring the palette of betting chips according to a state of game play.

8. A method of enabling a player to play a regulated gaming machine configured as a regulated video poker game, the regulated gaming machine including a player activated pointing device and a processor, the method comprising the steps of:

displaying a video poker pay table that includes a plurality of poker hands on which the player may place a bet;

displaying a plurality of betting chips, the displayed plurality of betting chips including at least one of a hold-down chip that is configured to enable the player to hold down a card on which the hold-down chip is placed such that the held-down card is unaffected by a re-deal of one or more of the plurality of face up cards and a re-deal chip that is configured to enable a random re-deal of a card on which the re-deal chip is placed;

selecting, using the player activated pointing device, a first betting chip of the displayed plurality of betting chips;

placing the selected first betting chip, using the player activated pointing device, on a first selected poker hand of the displayed video poker pay table;

selecting, using the player activated pointing device, a second betting chip of the displayed plurality of betting chips;

placing the selected second betting chip, using the player activated pointing device, on a second selected poker hand of the displayed video poker pay table, the second selected poker hand being different from the first selected poker hand;

randomly dealing a plurality of cards using the processor;

displaying at least one of the dealt plurality of cards face up;

using the player activated pointing device, placing one of the hold-down chip and the re-deal chip on a selected one of the displayed faced up cards and carrying out a re-dealing step to one of re-deal all but the card on which the hold-down chip has been placed, and re-deal only the card on which the re-deal chip has been placed, and rewarding the player according to the selected first betting chip if the displayed cards collectively form the first selected poker hand and rewarding the player according to the selected second betting chip if the displayed cards collectively form the second selected poker hand.

9. A method of enabling a player to play a regulated gaming machine configured as a regulated video poker game, the regulated gaming machine including a player activated pointing device and a processor, the method comprising the steps of:

displaying a video poker pay table that includes a plurality of poker hands on which the player may place a bet;

displaying a plurality of betting chips, the plurality of chips including at least a hold-down chip that is configured to enable the player to hold down a card on which the hold-down chip is placed such that the held-down card is unaffected by a re-deal of one or more of the plurality of face up cards and a re-deal chip that is configured to enable the player to randomly re-deal a card on which the re-deal chip is placed;

selecting, using the player activated pointing device, a betting chip of the displayed plurality of betting chips;

placing the selected betting chip, using the player activated pointing device, on a player-selected poker hand of the displayed video poker pay table before any cards are dealt;

randomly dealing a plurality of cards using the processor;

displaying at least one of the dealt plurality of cards face up;

placing, using the player activated pointing device, one of the hold-down chip and the re-deal chip on a selected one of the displayed faced up cards;

enabling the player to at least one of place additional bets and request a re-deal of at least one of the displayed face up cards according to a version of poker with which the regulated gaming machine is configured, the re-deal re-dealing one of all but the card on which the hold-down chip has been placed and only the card on which the re-deal chip has been placed;

rewarding the player according to the selected betting chip if the displayed cards collectively form the player-selected poker hand.

10. The method of claim 8, wherein the second displaying step is carried out with the plurality of betting chips including betting chips of different denominations, wherein the first selecting step is carried out with the first betting chip being of a first denomination and wherein the second selecting step is carried out with the second betting chip being of a second denomination that is different from the first denomination.

11. The method of claim 8, further comprising a step of grouping the displayed plurality of betting chips together by denomination to form a chip palette.

12. The method of claim 11, further comprising the step of dynamically configuring the palette of betting chips according to a state of game play.

13. The method of claim 9, further comprising a step of grouping the displayed plurality of betting chips together by denomination to form a chip palette.

14. The method of claim 13, further comprising the step of dynamically configuring the palette of betting chips according to a state of game play.

* * * * *